May 24, 1932.  G. L. WAITT  1,859,944

FISHING TACKLE

Filed July 2, 1931

Inventor,
George L. Waitt,
by Walter P. Geyer
Attorney.

Patented May 24, 1932

1,859,944

UNITED STATES PATENT OFFICE

GEORGE L. WAITT, OF WILDWOOD CREST, NEW JERSEY

FISHING TACKLE

Application filed July 2, 1931. Serial No. 548,326.

This invention relates to improvements in fishing tackle.

One of its objects is to provide a device or attachment for fish lines which is designed to automatically effect the quick and smart upward pull on the fish line when the fish grasps the hook by nibbling on the bait, thereby facilitating the catching of the fish and prevent its being ejected from the hook.

Another object of the invention is the provision of a simple, compact and inexpensive fish line attachment of this character whose parts are designed for positive action and ready adjustment.

In the accompanying drawings:—

Figure 1:
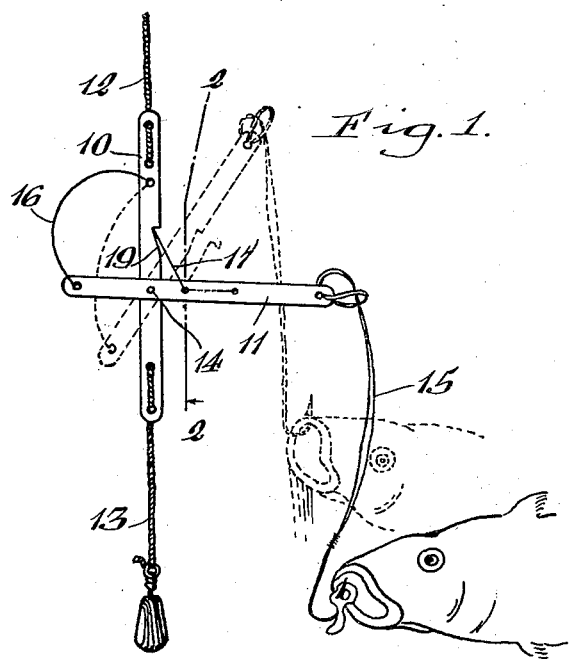
Figure 2:
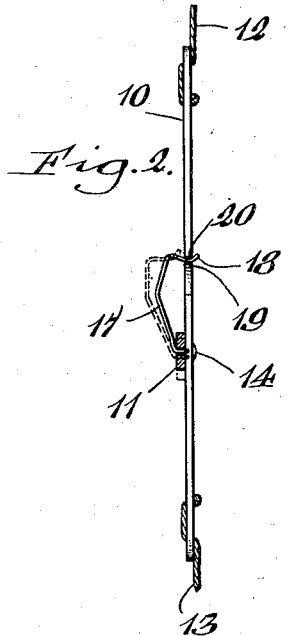
Figures 3, 4:
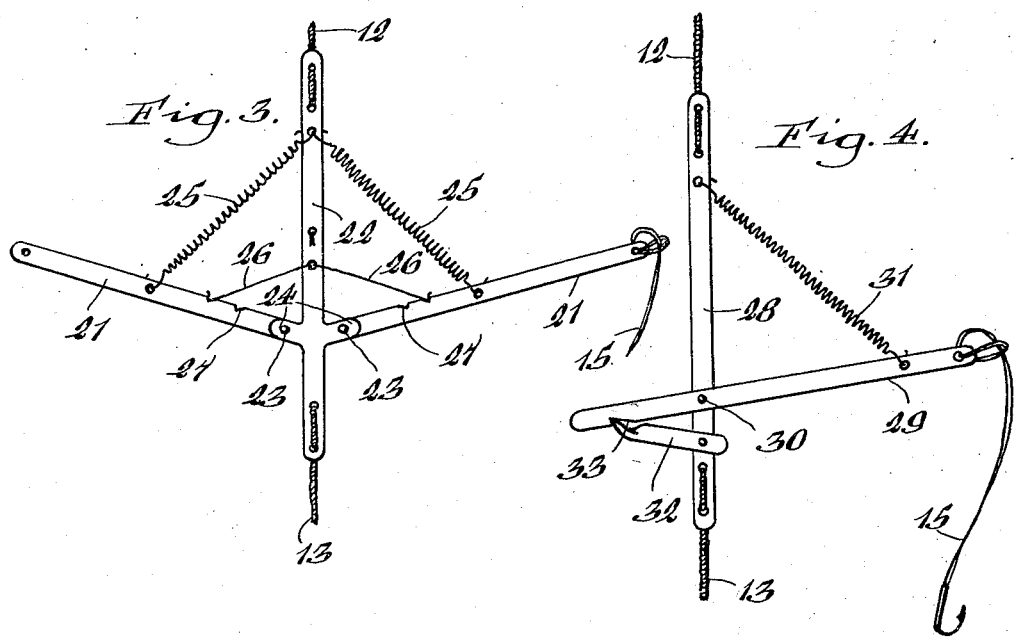

Figure 1 is a front elevation of a fish line attachment showing the preferred embodiment of my invention. Figure 2 is an enlarged vertical section thereof taken on line 2—2, Figure 1. Figure 3 is a front view of another embodiment of my invention. Figure 4 is a front elevation of another modified form of the same.

Similar characters of reference indicate corresponding parts throughout the several views.

In the preferred embodiment of my invention shown in Figures 1 and 2, the fishing tackle designed for facilitating the catching of fish is composed of two relatively movable bars or arms 10, 11, the bar 10 being connected at its upper end to the lower end of the fish line 12 and its lower end having a sinker line 13 attached thereto. The bar 11 is disposed in crosswise or intersecting relation with the companion bar 10 to swing vertically thereon and is fulcrumed to the latter intermediate its ends as indicated at 14.

Depending from one end of the foldable bar 11 is a hook-carrying line 15, and a spring 16, which may be of the bow-type as shown, or any other well known type, connects the opposite end of such bar with the upper end of the companion bar 10, as seen in Figure 1, this spring tending constantly to swing the bar 11 upwardly to the position indicated by dotted lines in said figure. In order to hold the bar 11 in its operative expanded position relative to the bar 10, which is the position of the parts ready for operation, I preferably employ a pawl or catch 17 made of spring wire or like material, the same being attached at its lower end to the bar 11 and terminating at its upper end in a laterally-bent hook 18 adapted to releasably engage a notch 19 formed in the adjoining edge of the suspension bar 10. The bow spring 16 which acts to shift the hook-carrying bar 11 upwardly, likewise acts to maintain the pawl 17 in operative engagement with its locking notch, said pawl being attached to such bar at a point outwardly from the pivot 14. This pawl is so constructed that it has a tendency to shift laterally away from the bar 10, so that when a fish is caught on the line 15, the bar 11 is momentarily swung downwardly which releases the pawl from the companion bar 10, the pawl shifting laterally clear of the latter to permit the hook-bearing arm to automatically swing upwardly to dotted line position shown in Figure 1. During this action the pawl 17, by its own tension, is held clear of or free from interference with the bar 10, and in again setting the parts it is necessary to force the pawl toward the bar 11 to bring its hook into engagement with the locking notch 19. As shown in Figure 2, the hook 18 has a looped bend or depression 20 therein which, when engaged with its locking notch, positively prevents the lateral shifting of the pawl out of its latched position.

In the embodiment of the invention shown in Figure 3, two hook-bearing arms 21 are provided extending from opposite sides of the bar 22 pending from the fish line 12, the hook-bearing arms being fulcrumed at 23 to the pendant bar, or if desired, to ears 24 formed thereon, as shown. A coil spring 25 connects each one of the bars 21 with the bar 22 and pawls 26 are provided which engage corresponding notches 27 in the bars 21 to normally latch the same in their operative position, these pawls being attached at their inner ends to the bar 22. The operation of this form of tackle is the same as that previously described.

In the modified form of the invention shown in Figure 4, the same consists of crossed bars 28, 29 fulcrumed intermediate their ends as indicated at 30 and interconnected at two of their opposing ends by a spring 31 which constantly tends to bring the hook-bearing arm 29 upwardly toward the companion arm 28. A pawl 32 fulcrumed to the bar 28 at a point below the fulcrum 30 is adapted to engage a notch 33 formed in the adjoining edge of the bar 29 for normally latching the parts in their operative position.

I claim as my invention:—

1. A device of the character described, comprising a pair of pivotally connected bars, one for suspension from a fish line and the other for suspension of the fish hook at one end, a spring connecting the hook-bearing bar with the line-suspension bar for urging the former in an upwardly-swinging direction and in contracted relation to the latter, and a catch connected to one of said bars adjacent their fulcrum for releasable engagement with the companion bar, said catch being released when a pull is exerted on the hook-bearing bar.

2. A device of the character described, comprising a pair of pivotally connected bars, one for suspension from a fish line and the other for suspension of the fish hook at one end, a spring connecting the hook-bearing bar with the line-suspension bar for urging said bars to a contracted position, and a catch connected to one of said bars adjacent their fulcrum for releasably holding said bars in their expanded position, said catch being movable with the hook-bearing bar when a pull is exerted thereon to release the catch from the companion bar.

3. A device of the character described, comprising a pair of pivotally connected bars, one for suspension from a fish line and the other for suspension of the fish hook at one end, a spring connecting the hook-bearing bar with the line-suspension bar for urging the former in an upwardly-swinging direction relative to the latter, and an automatically releasable catch applied to one of said bars, the companion bar having a notch in its adjoining edge for receiving the free end of said catch to hold the bars in their expanded position, said spring normally acting to maintain the catch in locking engagement with said notch and said catch being released from the notch when a pull is exerted on the fish-hook bearing arm.

4. A device of the character described, comprising a pair of pivotally connected bars, one for suspension from a fish line and the other being for suspension of the fish hook at one end, a spring connecting the hook-bearing bar with the line-suspension bar for urging the former in an upwardly-swinging direction relative to the latter, and a releasable catch applied to one of said bars, the companion bar having a notch in its adjoining edge for receiving the free end of said catch to hold the bars in their expanded position, said catch being laterally yieldable away from said notched bar to permit the same to clear the latter when the catch is released to effect the contraction of said bars.

5. A device of the character described, comprising a pair of pivotally connected bars, one for suspension from a fish line and the other for suspension of the fish hook at one end, a spring connecting the hook-bearing bar with the line-suspension bar for urging the former in an upwardly-swinging direction relative to the latter, and a releasable catch applied to one of said bars and terminating at its free end in a laterally-bent hook, the companion bar having a notch therein for receiving said hook.

6. A device of the character described, comprising a pair of pivotally connected bars, one for suspension from a fish line and the other being for suspension of the fish hook at one end, a spring connecting the hook-bearing bar with the line-suspension bar for urging the former in an upwardly-swinging direction relative to the latter, one of said bars having a locking notch therein, and a releasable catch applied to the companion bar and terminating at its free end in a laterally-bent hook arranged to engage said notch, said catch being laterally yieldable away from the notched bar to permit the same to clear the latter when the catch is released to effect the contraction of said bars, the hook on said catch having a depression to normally hold the catch against lateral movement.

GEORGE L. WAITT.